(12) United States Patent
Tanabe

(10) Patent No.: US 10,904,208 B2
(45) Date of Patent: Jan. 26, 2021

(54) CONTROLLER FOR CHANGING A CONVERSION DESTINATION OF A VIRTUAL AREA

(71) Applicant: FANUC CORPORATION, Yamanashi (JP)

(72) Inventor: Masaki Tanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/227,720

(22) Filed: Dec. 20, 2018

(65) Prior Publication Data

US 2019/0199680 A1 Jun. 27, 2019

(30) Foreign Application Priority Data

Dec. 26, 2017 (JP) .................. 2017-250158

(51) Int. Cl.
| | | |
|---|---|---|
| *H04L 29/12* | (2006.01) | |
| *H04L 29/08* | (2006.01) | |
| *H04L 12/861* | (2013.01) | |
| *H04L 29/06* | (2006.01) | |

(52) U.S. Cl.
CPC .............. *H04L 61/25* (2013.01); *H04L 61/35* (2013.01); *H04L 49/9047* (2013.01); *H04L 67/12* (2013.01); *H04L 67/42* (2013.01)

(58) Field of Classification Search
CPC ... H04L 63/10; H04L 67/109; H04L 67/2823; H04L 61/25; H04L 61/35; H04L 67/12; H04L 67/42; H04L 49/9047; G06F 12/1009; G06F 12/1036; G06F 12/1045; G06F 12/1054; G06F 12/0292; G06F 12/1081; G06F 2212/7201

See application file for complete search history.

(56) References Cited

U.S. PATENT DOCUMENTS

| | | | | | |
|---|---|---|---|---|---|
| 6,044,445 | A | * | 3/2000 | Tsuda ................ | G06F 12/1081 711/163 |
| 7,334,108 | B1 | * | 2/2008 | Case ................ | G06F 12/1045 711/209 |
| 9,996,462 | B1 | * | 6/2018 | Lin .................... | G06F 12/0292 |

(Continued)

FOREIGN PATENT DOCUMENTS

| | | |
|---|---|---|
| JP | 2001257707 A | 9/2001 |
| JP | 2008305201 A | 12/2008 |
| JP | 2009-104283 A | 5/2009 |

OTHER PUBLICATIONS

Notice of Reasons for Refusal for Japanese Application No. 2017-250158, dated Oct. 23, 2019, with translation, 6 pages.

(Continued)

*Primary Examiner* — Jungwon Chang
(74) *Attorney, Agent, or Firm* — RatnerPrestia

(57) ABSTRACT

The controller has a communication unit that receives read/write requests specifying an address of the same virtual area from a plurality of clients, and an actual area to be read/written by the communication unit. The communication unit has a management table that associates an identifier of the client with an address of the actual area that is different for each client, and an address conversion unit that carries out reading and writing to the address of the actual area associated with the identifier of the client with reference to the management table.

2 Claims, 7 Drawing Sheets

(56) References Cited

U.S. PATENT DOCUMENTS

2015/0193339 A1* 7/2015 Kim .................... G06F 12/0246
                                                  711/103
2015/0324285 A1* 11/2015 Murphy ................ G06F 12/109
                                                  711/6
2017/0132245 A1* 5/2017 Ioannou ................ G06F 16/178
2019/0018790 A1* 1/2019 Beard ................. G06F 12/1054

OTHER PUBLICATIONS

Notice of Reasons for Refusal for Japanese Application No. 2017-250158, dated Mar. 24, 2020, with translation, 6 pages.

* cited by examiner

| ID | IP ADDRESS | ACTUAL AREA ADDRESS |
|---|---|---|
| 1 | IP ADDRESS 1 | ACTUAL AREA ADDRESS 1 |
| 2 | IP ADDRESS 2 | ACTUAL AREA ADDRESS 2 |
| : | : | : |
| n | IP ADDRESS n | ACTUAL AREA ADDRESS n |

VIRTUAL AREA HEAD ADDRESS
ACTUAL AREA HEAD ADDRESS
SIZE
MAXIMUM CLIENT NUMBER n

CONTROLLER FOR CHANGING A CONVERSION DESTINATION OF A VIRTUAL AREA

CROSS-REFERENCE TO RELATED APPLICATION

This application is a new U.S. Patent Application that claims benefit of Japanese Patent Application No. 2017-250158 filed Dec. 26, 2017, the disclosure of this application is being incorporated herein by reference in its entirety for all purposes.

BACKGROUND OF THE INVENTION

1. Field of the Invention

The present invention relates to a controller, and more particularly to a controller capable of changing a conversion destination of a virtual area used in a communication for each client.

2. Description of the Related Art

There is a protocol for performing communication between a server and a client by the client making a read/write request to a specific area defined on the server. One example of such a protocol is Modbus/TCP.

Such a protocol is implemented, for example, as shown in FIG. 1. A virtual storage area (hereinafter simply referred to as a virtual area) is provided on a controller (for example, PLC: Programmable Logic Controller) as a server. A virtual area has an address space defined by a protocol, but it does not have entities such as memory. The virtual area is managed by a communication function (for example, Modbus) operating on the controller. A read/write request from the client is made by specifying an address of the virtual area. An address conversion function of the communication function converts the specified address of the virtual area into an address of an actual storage area (hereinafter simply referred to as actual area) of the controller. Therefore, a data read/write request specifying the virtual area by the client is executed for the actual area.

For example, Japanese Patent Application Laid-Open NO. 2009-104283 discloses a Modbus/TCP server function to enable free programming by performing conversion between a Modbus area (which corresponds to a virtual area) and an actual memory area (which corresponds to an actual area) by using a conversion table.

In such a protocol, when a plurality of clients communicate with one server, it is necessary to make the address of the actual area in which each client performs reading and writing different for each client. This is because, if a plurality of clients access the same address in the actual area, unintended data overwriting or the like may occur, and the expected results may not be obtained.

Therefore, when a plurality of clients communicate with one server, the address of the virtual area specified by the client for reading and writing also needs to be made different for each client (see FIG. 2).

Therefore, for each client, it is necessary to set in advance which address in the virtual area should be specified for reading and writing. The labor required for such individual setting was not small, which hampered productivity improvement.

SUMMARY OF THE INVENTION

The present invention has been made to solve such a problem and has an object to provide a controller capable of changing a conversion destination of a virtual area used in communication for each client.

According to an aspect of the present invention, there is provided a controller including a communication unit that receives read/write requests specifying an address of the same virtual area from a plurality of clients, and an actual area that is a target of reading and writing by the communication unit. The communication unit includes a management table that associates an identifier of the client with an address of the actual area that is different for each client and an address conversion unit that carries out reading and writing to the actual area from the address of the actual area associated with the identifier of the client with reference to the management table and the address of the virtual area.

Each of the virtual area and the actual area may have a common area. In this case, when receiving the read/write request specifying the common area in the virtual area, the address conversion unit can execute reading and writing to the common area of the actual area.

According to the present invention, it is possible to provide a controller capable of changing the conversion destination of the virtual area used in a communication for each client.

DETAILED DESCRIPTION OF THE PREFERRED EMBODIMENTS

First, an outline of a controller 1 according to the embodiment of the present invention will be described.

The controller 1 according to the present embodiment receives read/write requests specifying the same address of the virtual area from a plurality of clients. Due to an address conversion function of the controller 1, the client read/write request is executed for different actual area for each client. As a result, even for a read/write request specifying the address of the same virtual area, actual read/write is performed for different actual area for each client. Therefore, there is no collision of data reading/writing in the actual area between the clients.

As described above, according to the controller 1, a plurality of clients can specify the same virtual area address. Thus, on the client side, there is no need to individually set different virtual area addresses for each client, and it is possible to save time and effort for setting. More specifically, by setting the same virtual area address for a plurality of clients, it is possible to reduce the trouble compared to setting different virtual area addresses individually. Alternatively, by embedding a fixed virtual area address in the client application at the time of development, it is possible to reduce the trouble of setting the ex post facto to zero. It is also possible to easily cope with environments where it is difficult to fixedly determine a virtual area address, such that a mobile device as a client is dynamically added.

Subsequently, the configuration of the controller 1 according to the embodiment of the present invention will be described in detail with reference to the drawings.

Figure 1:
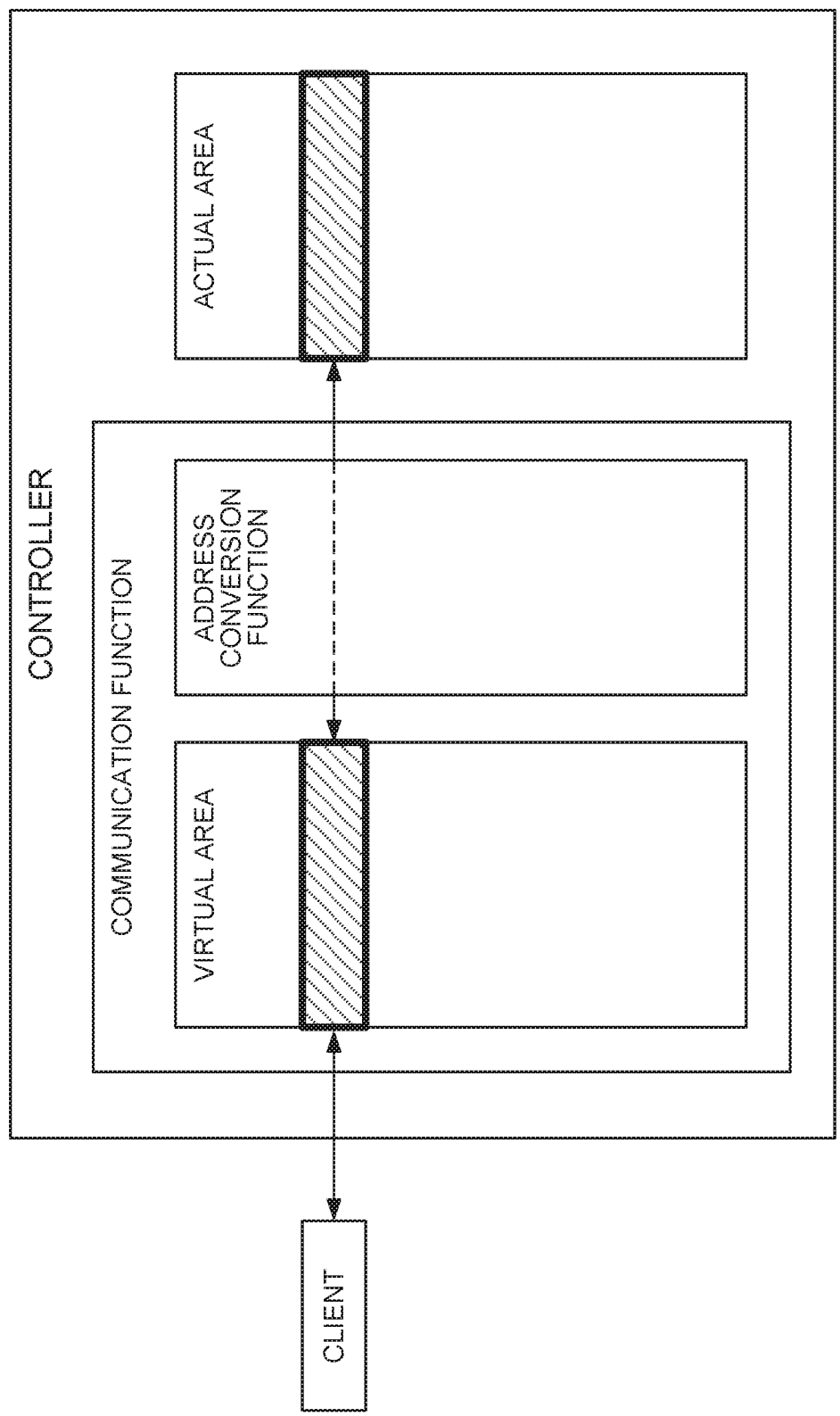
FIG. 1 is a diagram showing an outline in a case where there is a read/write request from one client in a conventional controller.
Figure 2:
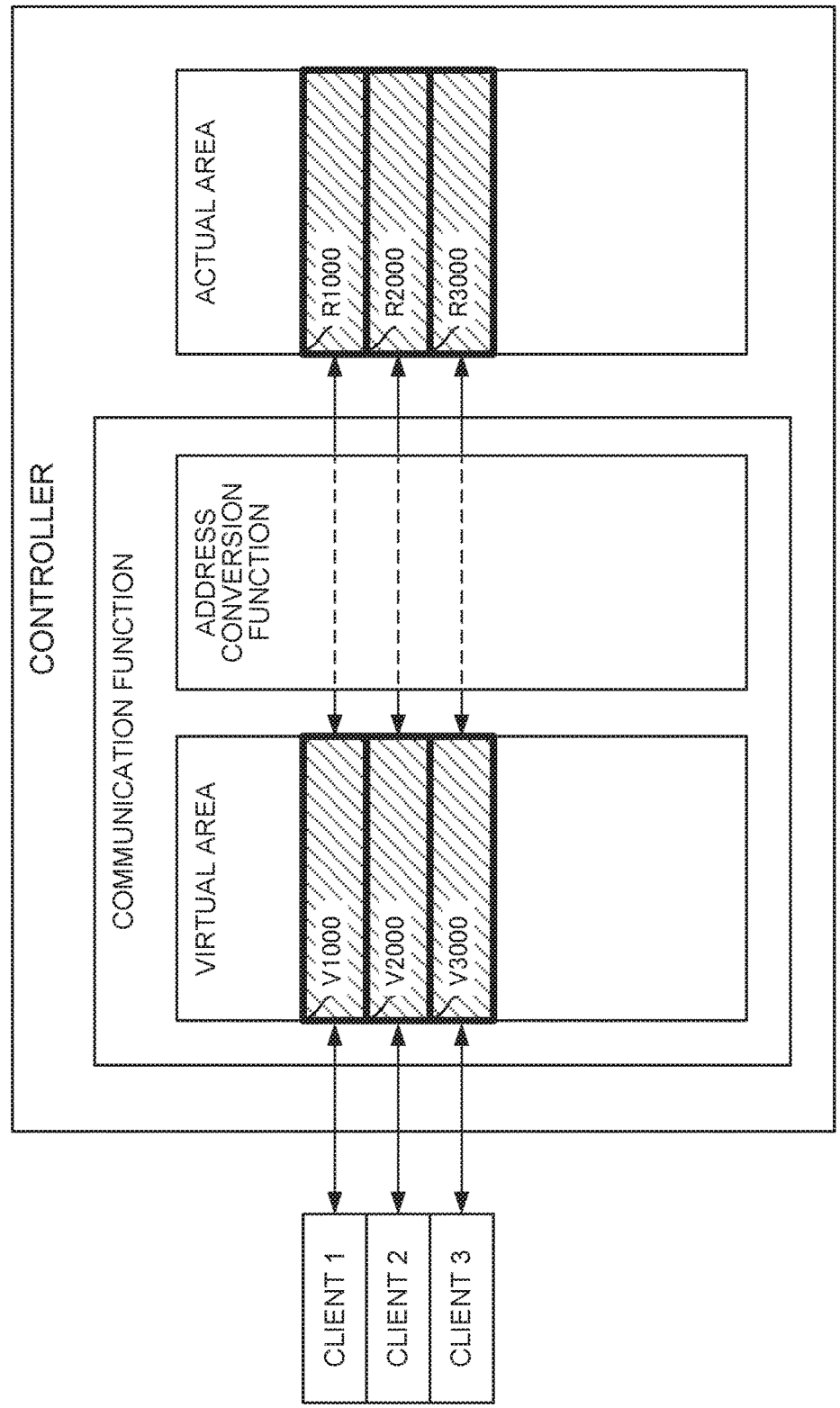
FIG. 2 is a diagram showing an outline in a case where there are read/write requests from a plurality of clients in a conventional controller.
Figure 3:
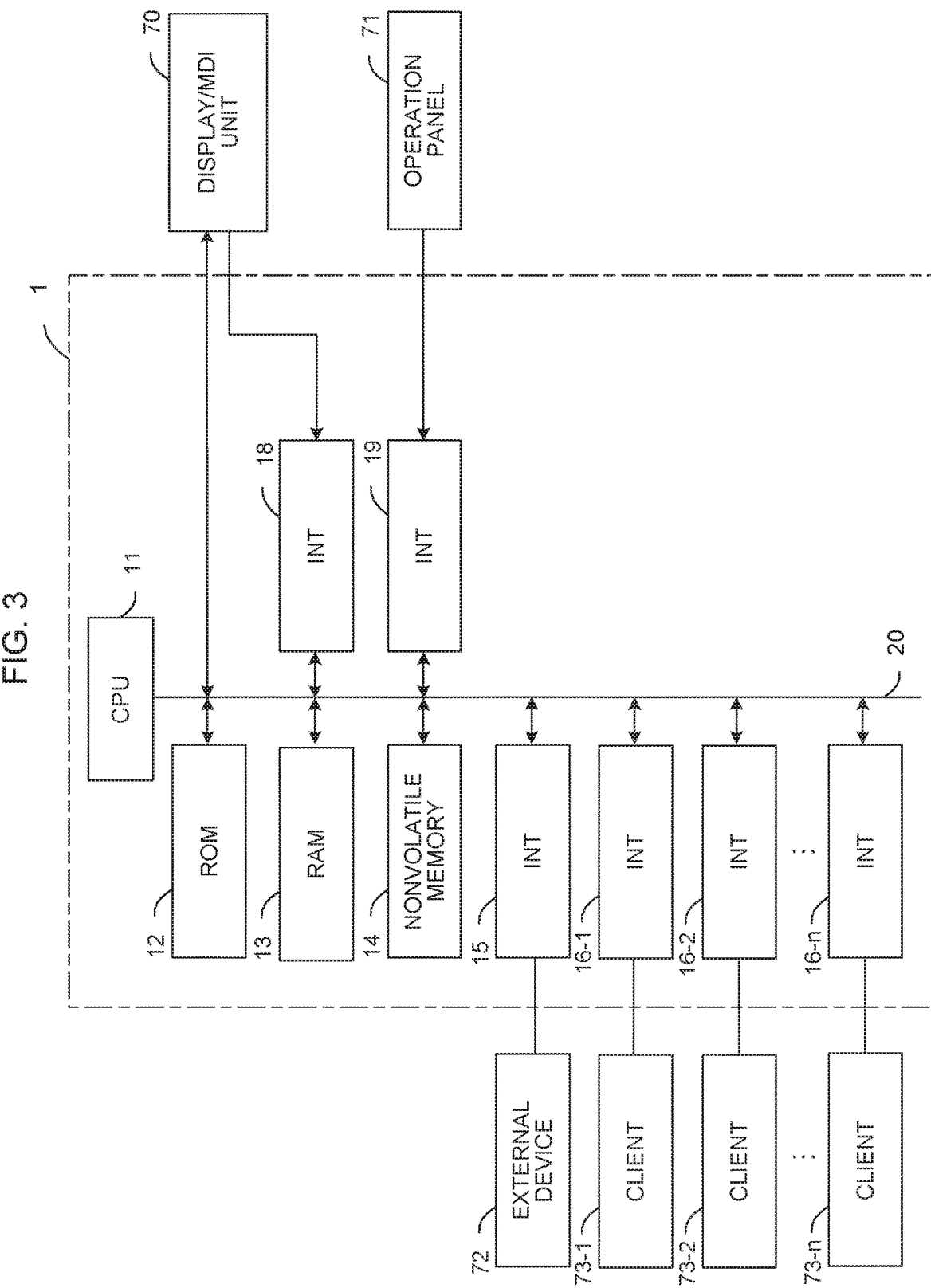
FIG. 3 is a diagram showing a hardware configuration of a controller according to an embodiment of the present invention.

FIG. 3 is a schematic hardware configuration diagram showing a main part of the controller 1 according to the embodiment of the present invention.

A CPU 11 of the controller 1 is a processor that controls the controller 1 as a whole. The CPU 11 reads a system program and a sequence program (hereinafter referred to as a program) stored in a ROM 12 or a nonvolatile memory 14 via a bus 20 and controls the entire controller 1 according to the program. A RAM 13 stores temporary calculation data, display data, various data input by an operator via a display/MDI unit 70 to be described later, and the like.

The nonvolatile memory 14 is configured as a memory that is kept in a storage state even when the power supply of the controller 1 is turned off, for example, by being backed up by a battery (not shown). The nonvolatile memory 14 stores programs read via an interface 15, programs and data input via the display/MDI unit 70 to be described later, and the like. A program or the like stored in the nonvolatile memory 14 may be developed in the RAM 13 at the time of use. In the ROM 12, various types of system programs for executing processes required for program creation and editing, and other necessary processes are written in advance.

The interface 15 is an interface for connecting the controller 1 and an external device 72. A program or the like is read from the external device 72. Further, for example, if the external device 72 is a sensor, sensor data or the like is read.

The display/MDI unit 70 is a manual data input device including a display, a keyboard and the like. An interface 18 receives commands and data from the keyboard of the display/MDI unit 70, and transfers them to the CPU 11.

Clients 73-1, 73-2, . . . 73-n are information processing devices that request the controller 1 to carry out reading and writing of data, and are connected to the controller 1 via interfaces 16-1, 16-2, . . . 16-n, respectively. The interfaces 16-1, 16-2, . . . , 16-n mediate transmission and reception of request data between the clients 73-1, 73-2, . . . 73-n and the CPU 11, respectively.

Figure 4:
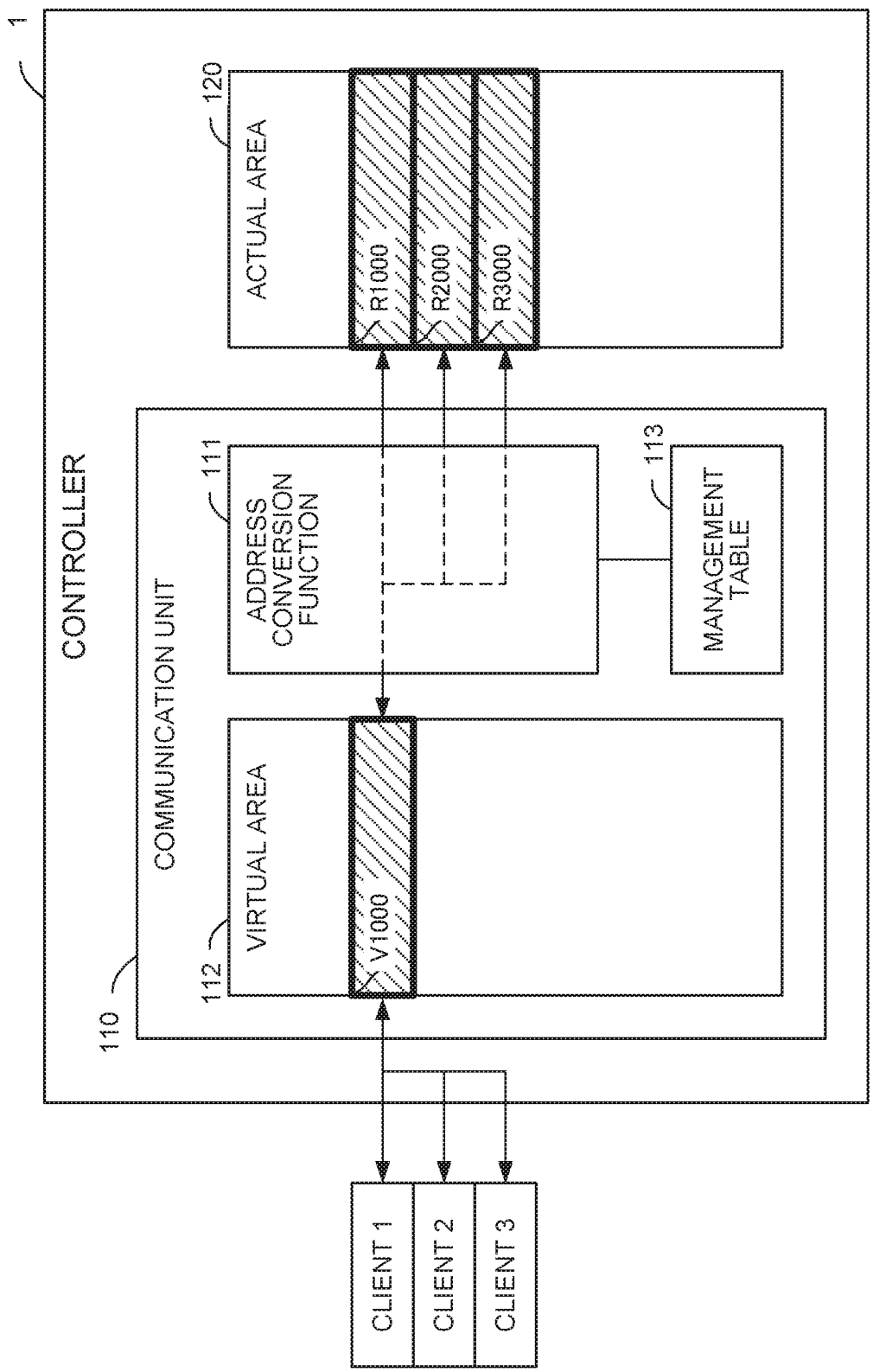
FIG. 4 is a diagram showing a functional configuration of the controller in FIG. 3.

FIG. 4 is a block diagram showing a functional configuration of the controller 1.

The controller 1 has a communication unit 110 that executes a communication function and an actual area 120 that is a storage area. The communication unit 110 includes an address conversion unit 111, a virtual area 112, and a management table 113. Each functional block of the controller 1 shown in FIG. 4 is realized by the CPU 11 included in the controller 1 shown in FIG. 3 executing a system program stored in the ROM 12 or the like and controlling the operation of each unit of the controller 1.

When a read/write request specifying the specific address of the virtual area 112 from the client occurs, the address conversion unit 111 refers to the management table 113 and executes reading/writing to the address of the actual area 120 predetermined for each client. Here, the address of the actual area 120 associated with the specific address of the virtual area 112 may be different for each client, and the correspondence is defined in the management table 113. That is, even when a plurality of clients specify the same specific address of the virtual area 112 and issue read/write requests, the address conversion unit 111 can carry out reading and writing of data to the address of the actual area 120 which is different for each client.

The management table 113 is a table which associates the identifier of the client with the address of the actual area 120. Upon receiving a read/write request specifying a specific address of the virtual area 112 from the client, the address conversion unit 111 searches the management table 113 using the identifier of the client as a key, and acquires the address of the corresponding actual area 120. It should be noted that the management table 113 does not need to hold data in a table format literally, and can hold data in an array or any other format.

First Embodiment

Figure 5:
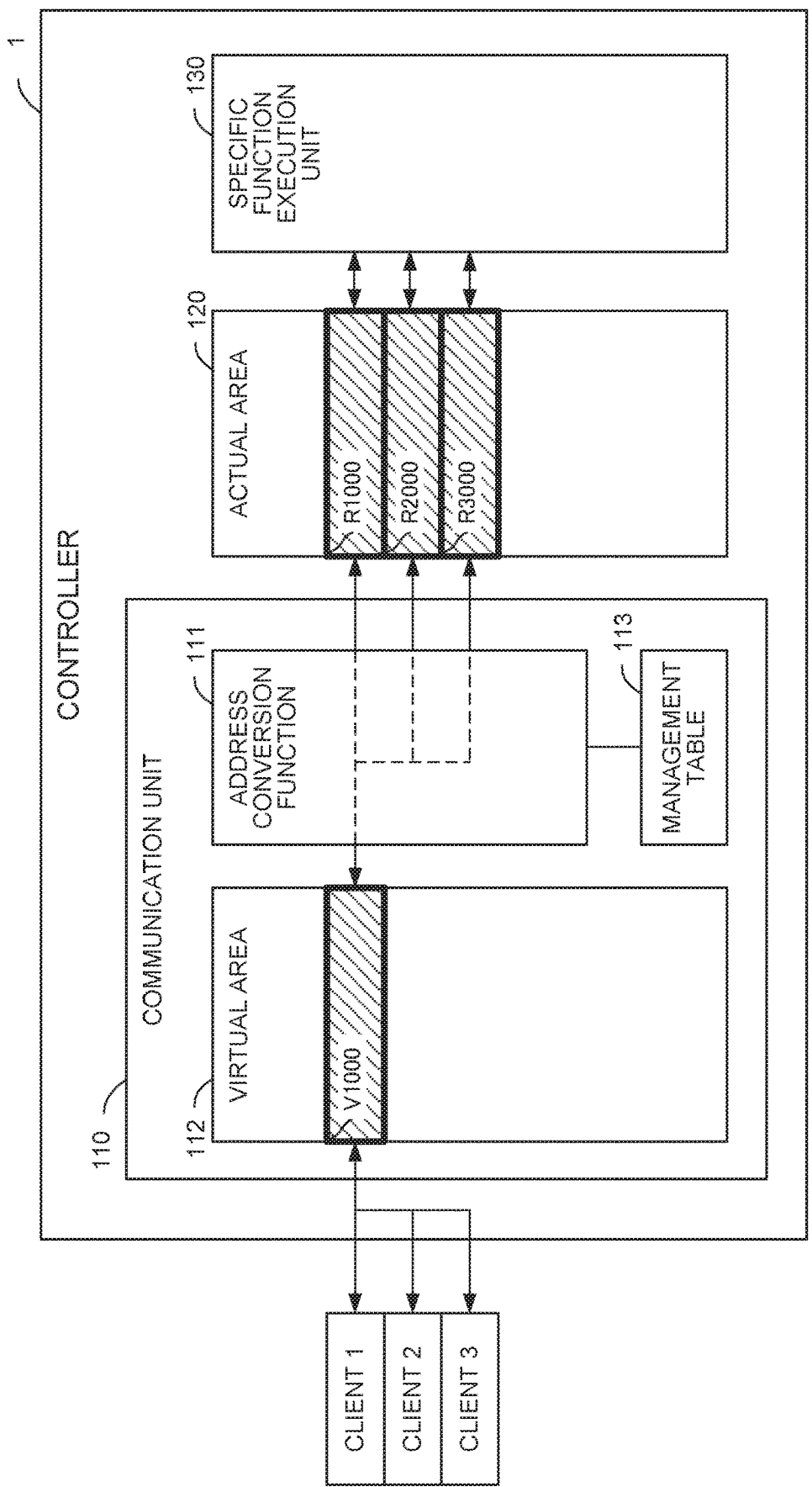
FIG. 5 is a diagram showing an outline of the controller according to a first embodiment.

The operation of the controller 1 according to the first embodiment will be described with reference to FIG. 5.

The controller 1 according to the first embodiment includes a specific function execution unit 130 in addition to the communication unit 110 and the actual area 120 described above. In addition, a plurality of sensors (for example, temperature sensors, etc.) are connected to the controller 1 via an interface (not shown), and it is assumed that each sensor can be identified by a unique sensor number.

For example, the specific function execution unit 130 receives an input of a sensor number and executes a process of returning an output value (for example, temperature) of a sensor identified by the sensor number. More specifically, when the sensor number is written in an address X of the actual area 120, the specific function execution unit 130 reads out the address X to acquire the sensor number, accesses an interface (not shown) to acquire the output value of the sensor number, and writes the output value to the address X of the actual area 120 as a return value.

Figures 6, 7:
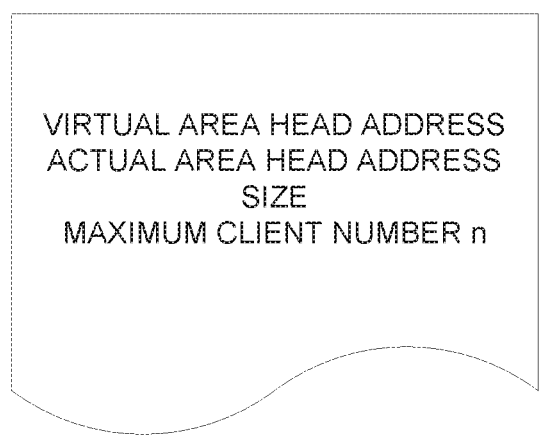
FIG. 6 is a diagram showing an example of a management table in a communication unit of the controller in FIG. 5.
FIG. 7 is a diagram showing an example of setting information read by an address conversion unit in the communication unit of the controller of FIG. 5.

In the management table 113 of the communication unit 110, an IP address as a client identifier and an address of the actual area 120 corresponding thereto are defined. FIG. 6 shows an example of the management table 113.

In the management table 113 of FIG. 6, actual area address 1 is associated with IP address 1 of client 1, actual area address 2 is associated with IP address 2 of client 2, . . . actual area address n is associated with IP address n of client n.

The address conversion unit 111 operates according to the following steps.

Step 1: The address conversion unit 111 reads the setting information as an initial operation. The setting information is information necessary for the communication unit 110 to operate, and is described in a predetermined setting file or the like. For example, as shown in FIG. 7, the head address of the virtual area 112, the head address of the actual area 120, the size of the area allocated per client in the actual area 120 (hereinafter simply referred to as size), the maximum client number n, and the like are included in the setting information.

Step 2: The address conversion unit 111 detects that a read/write request has occurred from the client to a specific address of the virtual area 112. In the present embodiment, the head address of the virtual area 112 included in the setting information is a specific address.

In this embodiment, the read/write request is a request to write a sensor number to be handed over to the specific function execution unit 130 or a request to read the sensor data outputted by the specific function execution unit 130.

Step 3: The address conversion unit 111 acquires the identifier, which is the IP address in the present embodiment, of the client that specified the specific address of the virtual area 112 and issued the read/write request. Then, the management table 113 is searched with the acquired IP address as a key. As a result of the search, if there is an IP address, the process proceeds to Step 5, and if not, the process proceeds to Step 4.

Step 4: If the IP address of the client does not exist in the management table 113, the address conversion unit 111 can add a new record with the IP address as a key to the management table 113. At this time, the actual area address calculated by the following equation (1) is registered in the IP address in association with each other.

$$\text{Client actual area address} = \text{Head address of the actual area } \mathbf{120} \text{ of the setting information} + (\text{size} \times \text{ID} - 1) \quad (1)$$

where the ID is a serial number (ID=1, 2, . . . , n) of the record added to the management table 113.

Step 5: When the IP address of the client exists in the management table 113, the address conversion unit 111 reads the actual area address associated with the IP address from the management table 113.

Step 6: The address conversion unit 111 carries out reading and writing of data to the actual area address acquired in Step 5.

Thus, the sensor number to be handed over from the client (client 1, 2, . . . , n) to the specific function execution unit 130 is written in the actual area address (actual area address 1, 2, . . . , n), or the sensor data to be handed over from the specific function execution unit 130 to the client (client 1, 2, . . . , n) is read from the actual area address (actual area address 1, 2, . . . , n).

With such a configuration, in the controller 1 according to the first embodiment, even when a plurality of clients specify the same virtual area address and request acquisition of different sensor data respectively, appropriate values for each client can be returned.

Second Embodiment

Figure 8:
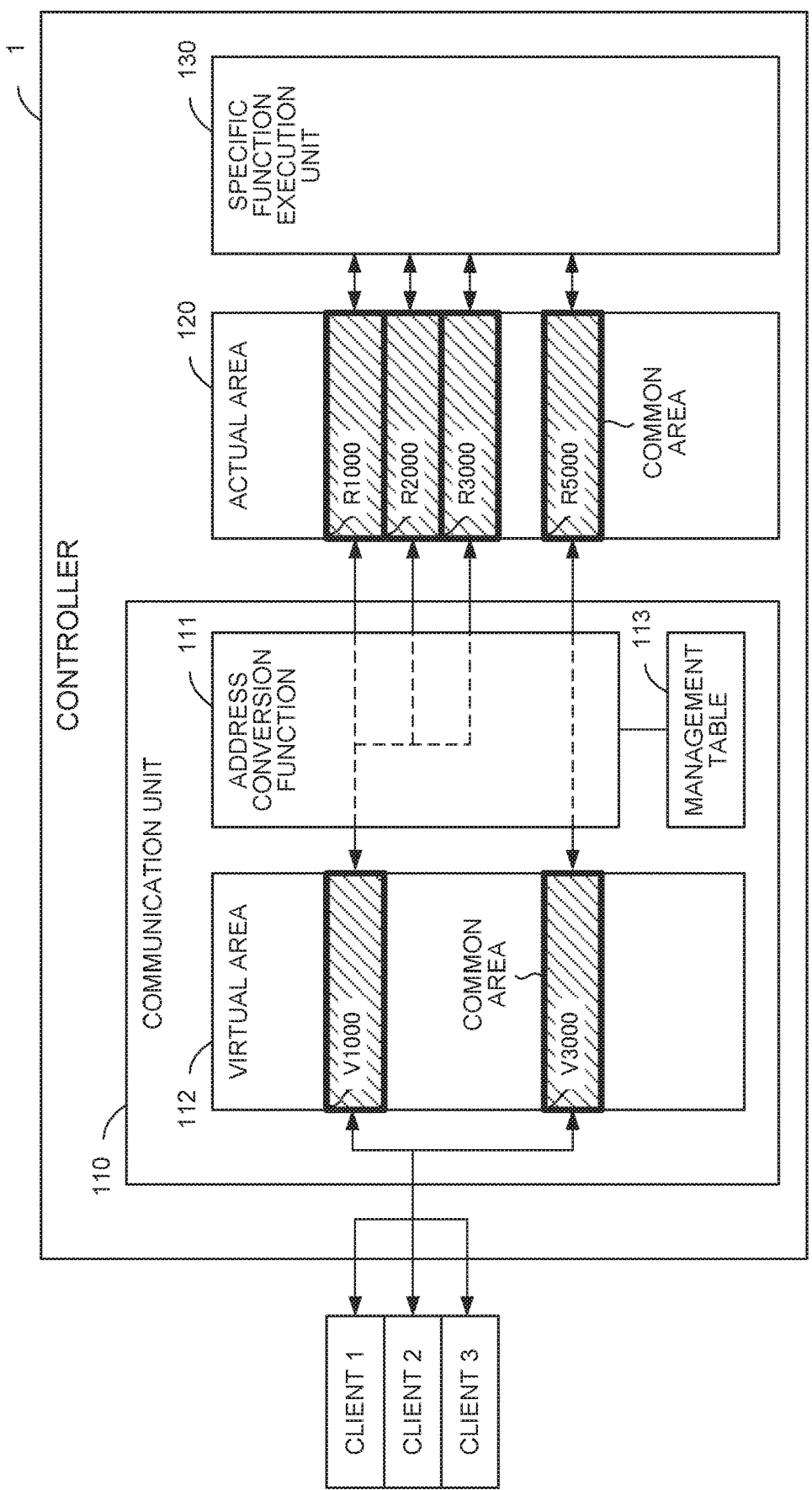
FIG. 8 is a diagram showing an outline of the controller according to a second embodiment.

With reference to FIG. 8, the controller 1 according to the second embodiment will be described.

In addition to the configuration shown in the first embodiment, the controller 1 according to the second embodiment is characterized in having an area which a plurality of clients can access in common, that is, a common area in the virtual area 112 and the actual area 120. That is, when the clients 1, 2, . . . , n carry out read/write requests specifying the common area address of the virtual area 112, the address conversion unit 111 carries out reading and writing to the common area address of the actual area 120 regardless of which client has issued the request.

The common area can be used, for example, to distribute data commonly used by a plurality of clients. Specifically, it is desirable to display important contents such as errors of the controller 1 to all connected clients. According to the configuration of the first embodiment, when distributing such contents to a plurality of clients, it is necessary to store them individually in corresponding addresses in the actual area 120. On the other hand, according to the configuration of the second embodiment, if such contents are registered in the common area of the actual area 120, they can be delivered to a plurality of clients, so it is possible to suppress the troubles of delivery and the time lag.

The common area can be defined, for example, by setting the size to zero in the setting information.

Further, in a case where the configuration in which the access specifying the specific address of the virtual area 112 is dispatched to a plurality of actual area addresses as in the first embodiment and the configuration in which the access specifying the common area address of the virtual area 112 is converted into the common area address of the actual area as in the second embodiment are made to coexist, a plurality of pieces of setting information can be provided. If the virtual area address specified by the client is associated with a size other than zero in the setting information, the access should be dispatched to a plurality of actual area addresses (as in the first embodiment). On the other hand, if the virtual area address specified by the client is associated with the size of zero in the setting information, the access is converted to that for the common area of the actual area 120.

Although the embodiments of the present invention have been described above, the present invention is not limited only to the above-described embodiments or examples, and can be implemented in various modes by making appropriate changes.

For example, in the above embodiment, the IP address is used as the identifier of the client. However, the present invention is not limited to this, and the IP address can be substituted with an arbitrary identifier (such as a MAC address) that can uniquely identify the client.

In the above-described embodiments, the controller 1 is exemplified by a PLC, but the present invention is not limited to this, and can be applied to any controller including a numerical controller.

The invention claimed is:

1. A controller comprising:
   a processor configured to receive read/write requests specifying addresses of a same virtual area from a plurality of clients; and
   an actual area to be read and written to by the processor, wherein:
   a management table associated with the processor associates an identifier of each client of the plurality of clients with an address of the actual area, wherein the address of the actual area is different for each client; and
   the processor, when detecting that a read/write request has been received from the each client to the specific address of the virtual area, acquires an identifier of the client, searches the management table for the acquired identifier as a key, reads the actual area associated with the identifier from the management table, and carries out reading and writing of data to the read actual address.

2. The controller according to claim 1, wherein
   the virtual area has a first common area,
   the actual area has a second common area, and
   the processor, when receiving a read/write request specifying the first common area, carries out reading and writing to the second common area.

* * * * *